United States Patent
Bouvier et al.

(10) Patent No.: US 9,587,202 B2
(45) Date of Patent: *Mar. 7, 2017

(54) PROCESS FOR REDUCING THE TOTAL ACIDITY OF REFRIGERATING COMPOSITIONS

(75) Inventors: Ludivine Bouvier, Orthez (FR); Beatrice Boussand, Sainte Foy Les Lyon (FR)

(73) Assignee: CECA S.A., La Garenne-Columbes (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/441,120

(22) Filed: Apr. 6, 2012

(65) Prior Publication Data

US 2012/0256120 A1    Oct. 11, 2012

Related U.S. Application Data

(60) Provisional application No. 61/473,456, filed on Apr. 8, 2011.

(30) Foreign Application Priority Data

Apr. 8, 2011   (FR) ..................... 11 53092

(51) Int. Cl.
*C10M 175/00* (2006.01)
*C09K 5/04* (2006.01)
*C10M 171/00* (2006.01)

(52) U.S. Cl.
CPC ....... *C10M 175/0091* (2013.01); *C09K 5/045* (2013.01); *C10M 171/008* (2013.01); *B01D 2253/108* (2013.01); *C09K 2205/126* (2013.01); *C10M 2201/10* (2013.01); *C10M 2207/2835* (2013.01); *C10M 2209/043* (2013.01); *C10M 2209/1033* (2013.01); *C10N 2220/302* (2013.01); *C10N 2240/30* (2013.01)

(58) Field of Classification Search
CPC .......... C09K 5/00; C09K 5/044; C09K 5/045; C09K 2205/122; C10M 169/06; C10M 169/02; C01B 39/14; C01B 39/22; C01B 39/24; C01B 39/00; C10B 39/20
USPC .............. 252/68, 69; 508/163; 423/700, 718
See application file for complete search history.

(56) References Cited

U.S. PATENT DOCUMENTS

| | | | |
|---|---|---|---|
| 2,583,812 A | 1/1952 | Briggs et al. | |
| 2,882,243 A | 4/1959 | Milton | |
| 3,625,866 A * | 12/1971 | Conde ............... | B01J 20/183 502/503 |
| 4,013,566 A | 3/1977 | Taylor | |
| 4,851,144 A | 7/1989 | McGraw et al. | |
| 5,514,633 A | 5/1996 | Noguchi et al. | |
| 5,879,581 A * | 3/1999 | Ushimaru ............... | C09K 5/045 252/67 |
| 6,044,660 A * | 4/2000 | Numoto et al. ................ | 62/468 |
| 6,168,720 B1 * | 1/2001 | Lavin ................... | B01D 53/261 210/660 |
| 6,840,058 B2 | 1/2005 | Suzuki et al. | |
| 7,000,426 B2 | 2/2006 | Jeuch | |
| 7,422,993 B2 | 9/2008 | Takewaki et al. | |
| 7,608,134 B1 | 10/2009 | Plee | |
| 2001/0014707 A1 | 8/2001 | Thomas et al. | |
| 2003/0171205 A1 | 9/2003 | Jaussaud et al. | |
| 2005/0119112 A1 | 6/2005 | Pfenninger et al. | |
| 2008/0116417 A1 * | 5/2008 | Samuels et al. ................ | 252/68 |
| 2009/0283712 A1 | 11/2009 | Zyhowski et al. | |
| 2010/0081851 A1 | 4/2010 | Cohen et al. | |
| 2012/0117990 A1 * | 5/2012 | Rached et al. .................. | 62/115 |
| 2012/0256119 A1 * | 10/2012 | Bouvier et al. ................. | 252/68 |
| 2012/0256120 A1 * | 10/2012 | Bouvier et al. ................. | 252/68 |

FOREIGN PATENT DOCUMENTS

| | | |
|---|---|---|
| EP | 1566600 | 8/2005 |
| FR | 1257034 | 3/1961 |
| FR | 2948678 A1 * | 2/2011 |
| JP | H04-110388 | 4/1992 |
| JP | 2001049275 A * | 2/2001 |
| JP | 2004060952 A * | 2/2004 |
| WO | 2004/037913 | 5/2004 |
| WO | 2007/144632 | 12/2007 |
| WO | 2008/027511 | 3/2008 |
| WO | 2008/027512 | 3/2008 |
| WO | 2008/027513 | 3/2008 |
| WO | 2008/027514 | 3/2008 |
| WO | 2008/027515 | 3/2008 |
| WO | 2008/027516 | 3/2008 |
| WO | 2008/027596 | 3/2008 |
| WO | 2008/042066 | 4/2008 |
| WO | 2010/063975 | 6/2010 |
| WO | 2010/075046 | 7/2010 |
| WO | WO 2012143651 A1 * | 10/2012 |

OTHER PUBLICATIONS

Donald W. Breck, "Zeolite Molecular Sieves", published by John Wiley and Sons (1974), pp. 83-107.

* cited by examiner

*Primary Examiner* — Douglas McGinty
(74) *Attorney, Agent, or Firm* — Smith, Gambrell & Russell, LLP

(57) ABSTRACT

The present invention relates to a process for reducing the total acidity of refrigerating compositions comprising at least one refrigerant with at least one lubricant, said process comprising at least one stage of bringing said composition into contact with at least one zeolitic adsorbent based on powder formed of zeolite(s) or on agglomerates formed of zeolite(s).

28 Claims, No Drawings

PROCESS FOR REDUCING THE TOTAL ACIDITY OF REFRIGERATING COMPOSITIONS

This application claims the benefit of U.S. Patent Application Ser. No. 61/473,456, filed 8 Apr. 2011, and French Patent Application Serial No. 11.53092, filed 8 Apr. 2011, both of which are herein incorporated by reference in their entirety.

The present invention relates to a process for reducing the total acid number (TAN) of refrigerants, in particular of refrigerants used in refrigerating devices and air conditioners.

The problems presented by substances which deplete the atmospheric ozone layer were dealt with at Montreal, where the protocol was signed imposing a reduction on the production and use of chlorofluorocarbons (CFCs). This protocol has formed the subject of amendments which have required the abandoning of CFCs and have extended regulation to other products, including hydrochlorofluorocarbons (HCFCs).

The refrigeration and air conditioning industries have invested a great deal in the replacement of these refrigerants and it is because of this that hydrofluorocarbons (HFCs) have been marketed.

For example, in the motor vehicle industry, the air conditioning systems of commercial vehicles in many countries which used a refrigerant based on chlorofluorocarbon (CFC-12) are now equipped with a refrigerant based on hydrofluorocarbon (1,1,1,2-tetrafluoroethane: HFC-134a), which is less harmful to the ozone layer.

However, from the viewpoint of the objectives set by the Kyoto protocol, HFC-134a, the GWP of which is 1430, is regarded as having a high heating power. Specifically, the contribution to the greenhouse effect of a refrigerant is quantified in particular by the GWP (Global Warming Potential) criterion, which summarizes the heating power by taking a reference value of 1 for carbon dioxide.

Hydrofluoroolefins (HFOs) have a relatively low heating power and thus meet the objectives set by the Kyoto protocol. The document JP 4-110388 discloses hydrofluoropropenes as heat transfer agent.

In the industrial field, the most widely employed refrigerating machines are based on the cooling by evaporation of a liquid refrigerant. After vaporization, the fluid is compressed and then cooled in order to return to the liquid state and thus continue the cycle.

The refrigerating machine compressors used are of the reciprocating, scroll, centrifugal or screw type. In general, internal lubrication of the compressors is essential in order to reduce wear and heating of the moving parts, to render them completely leaktight and to protect them from corrosion. Consequently, a lubricant or a mixture of lubricants is/are added to the refrigerant in order to provide for this lubrication.

In order for a refrigerant to be accepted commercially, it must in particular, in addition to exhibiting good heat transfer agent properties, be thermally stable and be compatible with the lubricants. This is because it is highly desirable for the refrigerant to be compatible with the lubricant used in the compressor present in the majority of refrigeration systems. This refrigerant/lubricant combination is important for the use and the effectiveness of the refrigeration system; in particular, the lubricant has to be sufficiently soluble or miscible in the refrigerant throughout the operating temperature range.

Thus it is, for example, that lubricants of polyalkylene glycol (PAG) type have been developed as lubricants for HFC-134a in motor vehicle air conditioning. Miscibility tests on 1,1,3,3,3-pentafluoropropene and 1,3,3,3-tetrafluoropropene with lubricants are described in example 2 of the document WO 2004/037913. Compatibility tests are also described in example 3 with polyalkylene glycol.

Yet other refrigerants, such as 2,3,3,3-tetrafluoropropene, are more effective and more respectful of the environment and are destined to equip numerous refrigerating systems, including motor vehicle air conditioners.

All these refrigerants, generally in combination with one or more lubricants, are subjected to greater or lesser variations in temperature. These mixtures of refrigerants and lubricants can, in addition, be in contact with various compounds, even in the form of traces, which, added to the variations in temperature, results in more or less significant and more or less rapid deterioration in these refrigerating mixtures.

Various solutions have already been proposed in order to stabilize these mixtures, in particular to limit their deterioration over time. For example, according to the document WO 2008/042066, as fluoroolefins are capable of decomposing on contact with moisture, oxygen or other components when they are used as refrigerant, possibly at high temperature, it is recommended to stabilize them with at least one amine.

Other stabilizing agents, such as benzophenone derivatives, lactones and some phosphorus-comprising compounds, have also been proposed for stabilizing fluoroolefins (WO 2008/027596, WO 2008/027516 and WO 2008/027515).

Yet other solutions have been proposed, such as the addition of an acidity trap comprising a siloxane (U.S. Pat. No. 4,851,144) or the addition of epoxides (WO 2008/027511), of functionalized perfluoropolyethers (WO 2008/027512), of aryl alkyl ethers (WO 2008/027513), of terpenes (WO 2008/027514 or US 2009/00283712), of phosphorus-comprising compounds (WO 2008/027515), of lactones (WO 2008/027516) or of corrosion-inhibiting additives (WO 2010/075046), to mention only some solutions available today.

All these solutions involve additives which are generally liquid and miscible with the refrigerants. In addition to the fact that these products are more or less effective, they are added in greater or lesser proportions and can thus disrupt the operation of the refrigerants themselves and can contaminate the environment when the refrigerants are discharged after use.

The document WO 2007/144632 recommends bringing a dehydrating agent comprising a molecular sieve (zeolitic adsorbent) into contact with a fluid comprising a fluoropropene, making it possible to remove the traces of water (of moisture) present in the refrigerating systems.

There remains today a need for alternative solutions which make it possible to improve the thermal stability of refrigerating compositions. Thus, a first objective of the present invention is to provide alternative solutions which make it possible to improve the thermal stability of refrigerating compositions, which are even more effective and more respectful of the environment.

Another objective of the present invention is to provide a solution which makes it possible to improve the thermal stability of refrigerants using means which can be easily recovered and recycled.

Yet another objective of this invention is to improve the thermal stability of refrigerants without modifying or interfering with the method of operation of the refrigerating systems.

The abovementioned objectives are achieved, in full or at least in part, by virtue of the invention which is described in detail below and which makes it possible to appreciably reduce the appearance of acidic entities which are one of the main causes of the premature aging of refrigerating compositions and in particular of the lubricants which are employed in these compositions with the refrigerants.

Yet other objectives will become apparent in the detailed description of the invention which follows.

The development of the acidity within the refrigerating compositions can be evaluated by the measurement of the Total Acid Number (TAN) of said compositions.

Thus, and according to a first aspect, the present invention relates to a process for limiting or controlling the increase in the total acid number in a refrigerating composition comprising at least one refrigerant and at least one lubricant, said process comprising a stage of bringing said refrigerating composition into contact with at least one zeolitic adsorbent.

Within the meaning of the present invention, the term "refrigerating composition" is understood to mean any composition known to a person skilled in the art which can be used in refrigeration or air conditioning systems and which comprises at least one refrigerant and at least one lubricant.

The refrigerants which can be mixed with the lubricants for refrigeration systems are also well known to a person skilled in the art. Mention may be made, among these, of fluorinated compounds, in particular hydrofluoroolefins (HFOs) and/or hydrofluorocarbons (HFCs), alone or as mixtures of two or more of them in all proportions. Mention may more particularly be made of tetrafluoroethanes and tetrafluoropropenes, such as, without implied limitation, 1,1,1,2-tetrafluoroethane (R-134a) and 2,3,3,3-tetrafluoropropene (HFO-1234yf).

The lubricants participating in the refrigerating compositions which can be used in the process of the present invention can also be of any type known to a person skilled in the art and, for example, can be chosen, without implied limitation, from the commonest lubricants employed in the fields of refrigeration and air conditioning for air or gas compressors and for refrigerating machine compressors and more generally for all dynamic or static refrigeration systems.

The lubricants for refrigeration systems most commonly used today are mineral oils or lubricants based on polyalkylene glycols (PAGs), on polyol esters (POEs) and/or on polyvinyl ethers (PVEs), preferably based on polyalkylene glycols (PAGs) and/or on polyvinyl ethers (PVEs).

The PAG lubricants are in the form of oxyalkylene homo- or copolymer(s). The preferred PAGs are homopolymers composed of oxypropylene groups and having a viscosity of 10 centiStokes (cSt) to 200 cSt at 40° C., advantageously between 30 cSt and 80 cSt. The hydroxyl groups at the ends of the chains of oxyalkylene homo- or copolymer(s) can be more or less replaced by $-O-C_nH_{2n+1}$ groups with n=1 to 10, the group with n=1 being preferred.

The PAGs which are entirely preferred are those having hydroxyl groups at each ending or $-O-C_nH_{2n+1}$ groups, where n is as defined above.

Mention may be made, as lubricants of PAG type, for example, without implied limitation, of the Zerol™ (Shrieve Chemical Products Inc.), Planetelf PAG (Total), Nippondenso ND8 (Nippon Denso) and Daphne Hermetic PAG (Idemitsu) lubricants.

The polyol esters (POEs) are obtained by reaction of a polyol (an alcohol comprising at least 2 hydroxyl —OH groups) with a monofunctional or polyfunctional carboxylic acid or with a mixture of monofunctional carboxylic acids. The water formed during this reaction is removed in order to prevent the reverse hydrolysis reaction.

The polyols preferred for the synthesis of the POEs are those having a neopentyl backbone, for example neopentyl glycol, trimethylolpropane, pentaerythritol and dipentaerythritol, pentaerythritol being the most frequently used polyol.

The carboxylic acids which react with the polyols for the formation of the POEs can comprise from 2 to 15 carbon atoms, it being possible for the carbon backbone to be linear or branched. Mention may in particular be made, among these acids, without implied limitation, of n-pentanoic acid, n-hexanoic acid, n-heptanoic acid, n-octanoic acid, 2-ethylhexanoic acid, 2,2-dimethylpentanoic acid, 3,5,5-trimethylhexanoic acid, adipic acid, succinic acid and others, and also the mixtures of two or more of these acids, in all proportions.

Some alcohol functional groups are not esterified; however, their proportion remains low. Thus, the POEs can comprise between 0 and 5 relative molar % of $CH_2-OH$ units, with respect to the $-CH_2-O-(C=O)-$ units.

The preferred POE lubricants are those having a viscosity of 1 cSt to 1000 cSt at 40° C., preferably of 10 cSt to 200 cSt and advantageously of 30 cSt to 80 cSt.

Mention may be made, as lubricants of POE type, for example, without implied limitation, of the Mobil EAL Arctic 68 and 32 (Mobil), Planetelf ACD 32 (Total) and Bitzer BSE 32 (Bitzer) lubricants.

The lubricants of polyvinyl ether (PVE) type preferably comprise copolymers exhibiting the following two units 1 and 2:

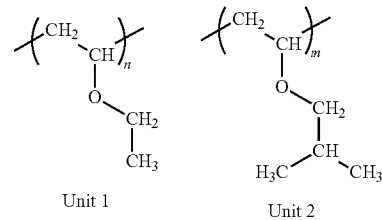

Unit 1              Unit 2 where n and m are integers respectively representing the numbers of units 1 and 2.

The properties of the lubricant (viscosity, solubility of the refrigerant and miscibility with the refrigerant in particular) can be adjusted by varying the m/n ratio and the m+n sum. The preferred PVE lubricants are those having from 50% to 95% by weight of units 1.

Mention may be made, as lubricants of PVE type, for example, without implied limitation, of the Daphne Hermetic Oil FVC 32D and 68D (Idemitsu) lubricants.

When the abovementioned lubricants are used in refrigeration systems, they are mixed with at least one refrigerant, in proportions well known to a person skilled in the art, for example so that the lubricant represents between 10% and 50% inclusive, with respect to the total weight of the lubricant+refrigerant composition.

The preferred compositions which can be used in the process of the present invention comprise at least one lubricant based on polyalkylene glycols (PAGs) or on polyol esters (POEs) or on polyvinyl ethers (PVEs) and at least one refrigerant comprising from 1 to 99% by weight of refrigerant chosen from 2,3,3,3-tetrafluoropropene (HFO-1234yf) and 1,1,1,2-tetrafluoroethane (R-134a).

The refrigerating compositions in the process of the present invention can also comprise one or more additives commonly used in the field, such as corrosion inhibitors, heat stabilizers, colorants, odorizing agents and others.

The invention thus relates, according to a preferred embodiment, to a process employing a refrigerating composition comprising at least one lubricant and at least one refrigerant and preferably a composition comprising at least one lubricant of PAG, POE and/or PVE type and at least one refrigerant chosen from R-134a and HFO-1234yf.

The process of the present invention is entirely appropriate for improving the thermal stability of refrigerating systems comprising PAG and R-134a, PAG and HFO-1234yf, POE and R-134a, POE and HFO-1234yf, PVE and R-134a, and PVE and HFO-1234yf, preferably comprising PAG and R-134a, PAG and HFO-1234yf, PVE and R-134a and PVE and HFO-1234yf.

The zeolitic adsorbents, or more simply the zeolites, which can be used in the context of the present invention can be of any type known to a person skilled in the art and in particular zeolites of zeolite A type, zeolites of faujasite type, that is to say zeolites X, MSX and LSX (for "Low Silica X"), and zeolites Y. It is understood that these different zeolites can be used alone or as mixtures of two or more of them.

Zeolites, or also molecular sieves, are chemical compounds widely used today in industry as adsorbent agents, in particular for drying gases or liquids. Zeolites are typically crystalline and porous compounds based on aluminosilicates which have a three-dimensional crystalline structure composed of an assembly of $SiO_4$ and $AlO_4$ tetrahedra connected to one another by virtue of the sharing of one or more oxygen atoms. These compounds thus form crystal lattices comprising pores of nanometric size.

These edifices generally comprise cations in order to render the system electrically neutral, these cations generally being cations comprising sodium, potassium or calcium but also barium, rare earth elements or also mixtures of two or more of these cations in all proportions.

In general, the zeolites used are synthetic zeolites obtained in the powder form on conclusion of a process for the nucleation and crystallization of aluminosilicate gels. Natural zeolites, such as, for example, zeolites of clinoptilolite, mordenite or chabazite type, the main uses of which are generally purification or dehydration operations, can also be used.

According to a preferred embodiment of the present invention, the zeolite(s) used comprise zeolites of zeolite A type, zeolites of faujasite type, that is to say zeolites X, MSX and LSX, and zeolites Y.

Zeolites correspond to the following general formula:

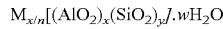

$M_{x/n}[(AlO_2)_x(SiO_2)_y].wH_2O$ in which:
M represents one or more cations with a total valency of n, w represents the number of water molecules, the ratio (y/x) is between 1 and 5, depending on the structures of the zeolites, and the sum (x+y) represents the number of tetrahedra per unit cell.

The structure and the properties of zeolite A are well known and extensively described in the literature, in particular in the work by Donald W. Breck, "Zeolite Molecular Sieves", published by John Wiley and Sons (1974), pp. 83 et seq., and by the patents of Milton (U.S. Pat. No. 2,882, 243) and Barrer (FR 1 257 034).

The Si/Al ratio in the zeolites A is always approximately 1. The presence of sodium cations makes it possible to provide the electrical neutrality of the structure.

The modification in the nature of the cations by exchange of all or part can be accompanied by a variation in the size of the pores or by a modification in the selectivity by creation of specific interactions with the adsorbed molecules and can thus change the adsorption properties.

Thus, for zeolite A, which, in the sodium form after synthesis, exhibits a pore opening of 4 Å (and frequently referred to as "zeolite 4A"), it is possible to carry out various exchanges of cations A in order to confer the desired properties on it. Frequently, the cations concerned are alkali metal or alkaline earth metal cations, such as lithium ($Li^+$), potassium ($K^+$), caesium ($Cs^+$), magnesium ($Mg^{2+}$), calcium ($Ca^{2+}$), strontium ($Sr^{2+}$), barium ($Ba^{2+}$) or cerium ($Ce^{3+}$), or cations of other elements, such as rare earth elements or metals, for example lanthanum ($La^{2+}/La^{3+}$), silver ($Ag^+$), copper ($Cu^{2+}$), nickel ($Ni^{2+}$), zinc ($Zn^{2+}$), iron ($Fe^{2+}, Fe^{3+}$), chromium ($Cr^{2+}$ à $Cr^{6+}$) and others.

Thus, depending on the type of cation exchange carried out, the zeolite A can, for example, be converted either:
into the calcium form by exchange with a calcium salt in aqueous solution, in order to obtain a zeolite having pores with an effective opening of 5 Å (and frequently referred to as "zeolite 5A"),
into the potassium form by exchange with a potassium salt in aqueous solution, and a zeolite is obtained having pores with an effective opening of 3 Å (and frequently referred to as "zeolite 3A"),
into different forms by mixing aqueous solutions of lithium, calcium or potassium salts, for example.

The term "zeolite 4A" is understood here to mean a zeolite of type A, essentially all the exchangeable cationic sites of which are occupied by sodium $Na^+$ cations (sodium form after synthesis).

The term "zeolite 5A" is understood here to mean a zeolite of type A, with 40% to 100% of the cationic sites of which (reported as equivalents) are occupied by $Ca^{2+}$ ions, and 0% to 5% are occupied by alkaline ions, earth-alkali ions, rare earth metal ions or metallic ions as previously defined, for example by sodium $Na^+$ ions; however, it would not be departing from the scope of the invention if other cations were present, as described above.

The term "zeolite 3A" is understood here to mean a zeolite of type A, from 20 to 70% (reported as equivalents) of the exchangeable cationic sites of which are occupied by potassium ions and 30% to 80% of the exchangeable cationic sites of which are occupied by alkaline ions, earth-alkali ions, rare earth metal ions or metallic ions as previously defined.

Faujasites constitute a group of mineral entities characterized by their crystallographic topographic structure which are described in particular in the work by Donald W. Breck, "Zeolite Molecular Sieves", published by John Wiley and Sons (1974), pp. 92 et seq.

The "Löwenstein" rule imposes on them an Si/Al molar ratio of greater than or at the very least equal to 1. The practice is to distinguish:
faujasites LSX (acronym for "Low Silica X") or faujasites with a low silica content which are zeolitic entities of type X with an Si/Al atomic ratio of less than or equal to 1.1, preferably between 1.00±0.05 and 1.10±0.05, including the limits, preferably equal to 1.00±0.05 (the values of less than 1 reflect the analytical uncertainties with regard to the measurement of this ratio and the higher values either the same analytical uncertainty or a tolerable departure from purity of the product);

faujasites MSX which are zeolitic entities of type X with an Si/Al atomic ratio of between 1.10±0.05, limits included, and 1.20±0.05, limits included, preferably equal to about 1.15±0.05; and conventional faujasites X with an Si/Al ratio of between 1.20±0.05, limits included, and 1.50±0.05, limits included, preferably equal to about 1.25±0.05; et faujasites Y with an Si/Al ratio>1.5.

The unit cell of zeolite X is a tetrahedron, the vertices of which are occupied by polyhedra of the same type as those present in zeolite A, each being connected to four other polyhedra by virtue of an octahedral substructure formed by a double ring comprising eight oxygen atoms. The center of each edge is always occupied by an oxygen atom, whereas the silicon and aluminum atoms occupy the different vertices of the polyhedra.

Zeolites X and Y generally are in the sodium form after they have been synthesized: NaX and NaY; zeolite LSX, after synthesis, is in the NaKLSX form.

These zeolites can also be subjected to exchange or modification treatments and the aim is generally to replace the alkali metal (Na, K) cations, for example with protons, alkali metal ions, alkaline earth metal ions, ions of rare earth elements or ions of metals, such as, for example, those mentioned above.

The zeolites of the invention can be provided in the powder form or in the form of agglomerates. The term "agglomeration" is understood to mean the shaping of the zeolite powder using an inorganic and/or organic binder. This shaping of agglomerates can be carried out according to any method known to a person skilled in the art and already widely described in the scientific literature, the patent literature or on the Internet. For example, the agglomerates can be in the form of blocks, beads from a few nanometers to a few millimeters, extrudates, bars, rods or molded components of various sizes and shapes, which can be referred to generically as cores, and the like.

This shaping is carried out by mixing a pasty mixture of zeolite(s), of binder(s) and optionally of one or more additives intended, for example, to facilitate the handling of the paste by modifying the rheology and/or the stickiness. This binder, which is generally inert, is intended to ensure the cohesion of the zeolite crystals with one another.

Use may be made, among inorganic binders, of alumina, montmorillonite (bentonite), attapulgite, sepiolite, zeolitizable clays, such as those chosen from kaolins, kaolinites, nacrites, dickites, halloysites, metakaolins, colloidal clays, for example of Attagel type, or also other natural minerals or zeolites (clinoptilolite, mordenite or chabazite), diatomaceous earths, talc and other inorganic binders known to a person skilled in the art, which can be used alone or as mixtures of two or more of them.

These inorganic binders may, where suitable, be converted in all or in part, into zeolite, according to any procedure known by the skilled in the art as zeolitization.

The organic binders, which can be used alone or in combination with the abovementioned inorganic binders, are understood to include any polymer matrix known per se to a person skilled in the art who is an expert in polymers. It can comprise a thermoplastic and/or thermosetting homopolymer and/or copolymer, for example, and without implied limitation, polyurethane, fluoropolymers, such as PVDF, epoxide resins and others. These polymers can be provided in all forms, for example in the expanded or semiexpanded foam form.

Mention may be made, as examples of polymer matrices, of those described in the international application WO 2010/063975, in which the polymer matrix comprises a polyolefin (for example of polyethylene or polypropylene type, and others), elastomers (such as those of acrylate copolymer type, for example ethylene/butyl acrylate copolymer type), a polyamide, a polyester or also a blend of two or more of these polymers.

The polymer matrix can also comprise, in all or in part, one or more polymers, homo- and/or copolymers, capable of forming a supramolecular assembly. The term "supramolecular assembly" is understood to mean polymers, homo- and/or copolymers, capable of associating with one another by means of hydrogen bonds.

Mention may be made, among "supramolecular" polymers, as nonlimiting examples, of semicrystalline polymers and in particular those formed by supramolecular assembling of compounds resulting from the condensation of a fatty acid and/or of a fatty acid dimer and/or of a fatty acid trimer and of at least one associative amine (capable of forming hydrogen bonds) chosen from 1-(2-aminoethyl) imidazolidin-2-one (UDETA), 1-(2-[(2-aminoethyl)amino] ethyl)-imidazolidone (UTETA), 1-(2-{2-[(2-aminoethyl) amino]ethylamino}ethyl)-imidazolidone (UTEPA), N-(6-aminohexyl)-N'-(6-methyl-4-oxo-1,4-dihydropyrimidin-2-yl)urea (UPy), and their mixtures.

In addition to the inorganic and/or organic binders, it is possible to add, to the zeolites, one or more additives commonly employed and known to a person skilled in the art, for example the additives chosen from silica, colloidal silica, cellulose, corn starch or any other type of poreforming agent.

Generally, the zeolites employed in the present invention can be provided in any form, for example in the form of a zeolitic agglomerate comprising an organic binder, as described in the international application WO 2010/063975 for the removal of water in the double glazing application, or also as described in the U.S. Pat. No. 2,583,812 and U.S. Pat. No. 4,013,566 and the patent applications US 2001/0014707 and EP 1 566 600, in which are disclosed solids based on molecular sieves (zeolites) and on polymers intended for the drying of refrigerants.

Within the meaning of the invention, the zeolitic agglomerate based on organic binder is generally obtained from a compound (blend), followed by shaping, for example by extrusion, molding, extrusion-molding, extrusion-injection molding or any other technique known to a person skilled in the art which makes it possible to obtain an article in the solid form starting from at least one molten polymer matrix.

In one embodiment, the adsorbent material according to the present invention can additionally comprise one or more additives commonly used in compounding techniques. Nonlimiting examples of such additives can be chosen from UV stabilizers, pigments, dyes, antioxidants, impact modifiers, phase change materials (PCMB), flame retardants, odorous agents, cellulose and others, alone or as mixtures.

The zeolitic compounds, whether in the agglomerated form or in the powder form (i.e. nonagglomerated form), which can be used in the context of the present invention can optionally be subjected to a treatment by impregnation, for example impregnation in the aqueous phase using alkali metal hydroxide(s) and/or alkaline earth metal hydroxide(s) or by incorporation of this/these hydroxide(s) and/or carbonate(s) and/or salt(s) of alkali metal(s) and/or alkaline earth metal(s), before, after or during the agglomeration stage and/or before, after or during the shaping stage.

This impregnation operation is targeted at impregnating the zeolites or the zeolitic agglomerates with one or more metals, nonmetals and/or rare earth elements chosen, for example, from aluminum, scandium, gallium, iron(III), chromium(III), indium, yttrium, lanthanides or more generally rare earth elements, alone or as mixtures, and/or one or more divalent ions chosen from calcium, strontium, zinc, copper, chromium(II), iron(II), manganese, nickel or cobalt ions, alone or as mixtures.

According to another aspect, it should be understood that the treatments targeted at carrying out the cationic exchanges or modifications defined above can be carried out either on the zeolite crystals (powder) or on the preshaped zeolites (agglomerated, impregnated and others) or also before and after shaping the zeolitic adsorbents.

According to a preferred embodiment of the present invention, the zeolitic adsorbents are based on zeolite A or on faujasite zeolite and more preferably still the zeolitic adsorbents are based on zeolite(s) A (3A, 4A or 5A) and more preferably either on zeolite 3A powder or on agglomerates based on zeolite A powder, containing potassium, for example exchanged with potassium, it being possible for the potassium exchange to be carried out either on the starting powder and/or on the final agglomerate.

According to another preferred embodiment, the zeolitic adsorbents which can be used in the context of the present invention are based on zeolites A containing potassium, for example exchanged with potassium, the degree of exchange of which is between 20% and 70% (reported as molar equivalents) of all of the exchangeable cationic sites, preferably between 30% and 70%, more preferably between 40% and 70% and very particularly preferably between 50% and 70%.

When the zeolitic adsorbents are agglomerates of zeolites, the agglomeration binder is preferably attapulgite, colloidal attapulgite, sepiolite, bentonite, kaolin or halloysite, it being possible for these agglomeration binders to be used alone or as mixture(s) with other natural clays or zeolites (clinoptilolite, mordenite or chabazite). Preferably, the agglomeration binder predominantly comprises attapulgite or kaolin and more preferably attapulgite.

Mention may be made, as nonlimiting examples of zeolitic adsorbents which can be used in the context of the present invention, of the adsorbents sold by CECA under the Siliporite® H3Ri, Siliporite® NK10, Siliporite® NK30, Siliporite® SA 1720, Siliporite® NK20 and Siliporite® G5 XP names, those sold by Zeochem under the Purmol® 3ST (3A), Purmol® 4ST (A), Zeochem® Z4-01 and Zeochem® 4A-8BL names, or also those sold by Grace under the Sylosiv® and Cryosiv® names or by UOP under the Molsiv™ 3A, Molsiv™ 4A, Molsiv™ 5A, XH-7™, XH-9™ and XH-11™ names.

Thus, the process according to the present invention comprises a stage of bringing at least one refrigerating composition as defined above into contact with one or more zeolitic adsorbent(s) as described above, the zeolitic adsorbent(s) making it possible to improve the thermal stability of said refrigerating composition.

In the context of the present invention, the thermal stability of a refrigerating composition is evaluated by measuring the Total Acid Number (TAN). Specifically, refrigerating compositions, which are subjected to more or less large variations in temperature, change over time to in the end become unsuitable for the use for which they are intended.

This change in the quality of the refrigerating compositions can be measured by numerous factors and in particular by the total acid number TAN. This is because it is known that the aging of lubricants is mainly due to the presence of acidic entities in the lubricants, which tend to increase over time. In the majority of cases, the total acid number slowly increases with the operating time and can be a good indicator for carrying out the replacement of the refrigerating composition.

The amount of acidic entities in the lubricants and more generally in the refrigerating compositions can be measured by the total acid number TAN, which corresponds to the number of milligrams of potassium hydroxide necessary to neutralize the acidic entities present in one gram of lubricant.

The Applicant Company has discovered, surprisingly, that bringing at least one zeolitic adsorbent as described above into contact with a refrigerating composition subjected to more or less large variations in temperature makes it possible to limit the increase in the TAN of said composition over time, indeed even to stabilize the TAN of said refrigerating composition, this having the effect of appreciably slowing down the aging of said composition and consequently of lengthening the lifetime thereof and of lengthening the periods between which the refrigerating compositions have to be regenerated or replaced, in full or in part.

Specifically, oils (lubricants) have many functions and mention may be made, inter alia, of the reduction in friction and resistance to motion in machines, in order to improve their efficiency and to save energy, to protect the lubricated parts from the various forms of corrosion and wear, thus to contribute to their longevity, to remove the heat produced in engines or during machining, to promote the thermal equilibrium of the machines, to improve the leaktightness with respect to gases, liquids or dust, to remove impurities and wear debris, to transmit energy or heat, to ensure electrical insulation or to improve the surface condition of the machined parts, to mention only some of them.

Thus, the process according to the present invention exhibits numerous advantages, among which may be mentioned, inter alia, the limitation on the deterioration in the lubricants, the improvement in the lubricating properties over time, the limitation on the wear of the systems using these lubricants, and a degree of advantage with regard to protecting the environment, by reducing the amounts of discharges of spent refrigerating compositions, their operating lives being extended.

The method of bringing at least one zeolitic adsorbent defined above into contact with a refrigerating composition can be of any type known per se, that is to say any method of bringing a solid into contact with a liquid, whether statically or dynamically.

Thus, the zeolitic adsorbent can be simply placed in the vessel, tank or sump comprising the refrigerating composition, with or without stirring. In an alternative form, the refrigerating composition can be forced through the zeolitic adsorbent(s), for example placed in a cartridge or agglomerated in the form of a core of appropriate size and dimensions, a more or less high pressure being or not being applied to the refrigerating composition.

The amount of zeolitic adsorbent(s) coming into contact with the lubricants can vary within wide limits, in particular according to the quality and the amount of refrigerating composition to be treated and the magnitude and the frequency of the variations in temperature. A person skilled in the art can easily adjust the amount of zeolitic adsorbent(s)

to be used according to the operating conditions of the devices and systems employing the refrigerating compositions.

Yet another advantage related to the process of the present invention employing zeolitic adsorbents is that the latter can be easily separated from the spent refrigerating compositions according to any technique well known to a person skilled in the art relating to liquid/solid or gas/solid separation techniques.

Furthermore, zeolitic adsorbents are known, at least for some of them, for their dehydrating capabilities. Thus, the process of the present invention also exhibits the advantage of making it possible to control the change in the total acid number of a refrigerating composition while providing for the removal of the traces of water present in said refrigerating compositions. The process of the present invention, by this combined action, thus makes it possible to effectively limit the premature aging of the refrigerating compositions while respecting the environment.

The zeolitic adsorbents described above for stabilizing or at the very least slowing down the aging of the refrigerating compositions and thus increasing their operating lifetime can thus be used in a great many fields and a great many applications, in particular applications where the refrigerating compositions are subjected to more or less frequent and more or less large variations in temperature.

Mention may be made, as nonlimiting examples of applications in which the use according to the present invention can be implemented, of:

refrigeration, in particular domestic or commercial refrigeration, cold rooms, food industry, processing industry, refrigerated transport (trucks, ships);
  air conditioning: motor vehicle air conditioning or domestic, commercial or industrial air conditioning; for the latter applications, the appliances used are either chillers or direct expansion appliances;
  heat pumps, in particular medium- and high-temperature heat pumps;
  electric transformers;
  cutting tools, and metal cutting tools;
  and others.

The present invention is now illustrated by means of the examples which follow and which do not in any way limit the field of the invention, the scope of protection of which is conferred by the appended claims.

EXAMPLE 1

Thermal Stability Tests

The thermal stability tests are carried out on compositions for refrigerating systems, that is to say comprising a refrigerant and lubricant, according to the standard ASHRAE 97-2007: "Sealed glass tube method to test the chemical stability of materials for use within refrigerant systems".

The test conditions are as follows:
  weight of refrigerant: 2.2 g
  weight of lubricant: 5 g
  weight of zeolitic adsorbent: 40 to 1000 mg
  temperature: 200° C.
  duration: 14 days The zeolitic adsorbent and the lubricant are introduced into a glass tube with a volume of 42.2 ml. The tube is subsequently placed under vacuum and then the refrigerant is added. The tube is then sealed in order to hermetically close it and is placed in an oven at 200° C. for 14 days.

Various analyses are carried out at the end of the test:

The gas phase is recovered in order to be analyzed by gas chromatography: the main impurities are identified by GC/MS (gas chromatography/mass spectrometry). Impurities coming from the refrigerant and those coming from the lubricant can thus be grouped together.

The lubricant is analyzed: color (by spectrocolorimetry, Labomat Dr Lange Lico220 Model MLG131), water content (by Karl Fischer coulometric titration, Mettler DL37) and total acid number (by quantitative determination with 0.01N methanolic potassium hydroxide solution).

The lubricants used in the tests are commercial PAG and POE lubricants: PAG ND8 and POE Ze-GLES RB68, sold respectively by Nippon Denso and Nippon Oil.

The refrigerants used for these tests are either HFO-1234yf or R-134a.

The results shown in the following table 1 are obtained with HFO-1234yf and, as lubricant, the commercial PAG lubricant PAG ND8 and various zeolitic adsorbents supplied by CECA S.A.

TABLE 1

| Adsorbent | Type of adsorbent | Amount of adsorbent (mg) | TAN (mg KOH/g) |
|---|---|---|---|
| None | — | — | 4.7 |
| Siliporite ® NK30 AP Powder | 3A | 200 | 1.7 |
| Siliporite ® NK30 AP Powder | 3A | 1000 | 2.6 |
| Siliporite ® NK30 AP Powder overexchanged | 3A | 200 | 1.5 |
| Siliporite ® NK30 AP Powder overexchanged | 3A | 1000 | 2.5 |
| Siliporite ® NK30 Beads (Static) | 3A | 1000 | 1.6 |
| Siliporite ® NK10 AP Powder | 4A | 1000 | 2.7 |
| Siliporite ® NK20 | 5A | 1000 | 2.4 |
| Siliporite ® G5 XP Powder | 10A | 1000 | 2.7 |

These first results show that the presence of zeolitic adsorbents in the refrigerating compositions makes it possible to considerably reduce the TAN of the lubricants.

These results are confirmed, in the following table 2, with the tests carried out with compositions comprising R-134a and, as lubricant, the lubricant PAG ND8 and various zeolitic adsorbents supplied by CECA S.A.

TABLE 2

| Adsorbent | None | Siliporite ® NK30 AP Powder | Siliporite ® NK30 AP Powder overexchanged |
|---|---|---|---|
| Type of adsorbent | — | 3A | 3A |
| Amount of adsorbent (mg) | — | 200 | 200 |
| TAN (mg KOH/g) | 2.9 | 0.5 | 0.4 |

It is thus observed that, in the presence of zeolitic adsorbent, the total acid number at the end of the test in the lubricant is greatly reduced, generally divided by 2 or 3. For the tests in the presence of HFO1234yf, it changes from 4.7 mg KOH/g without adsorbent to values of between 1.5 and 2.7 mg KOH/g with adsorbent. For the tests with R-134a, it changes from 2.9 mg KOH/g without adsorbent to 0.5 mg KOH/g with adsorbent.

In addition, whatever the type of adsorbent (3, 4, 5 or 10 Å), the results are identical: the total acid number is divided by a factor of approximately 2 in the tests carried out in the presence of 1 g of adsorbent.

EXAMPLE 2

Effect of the Zeolitic Adsorbent on the Reduction in the Water Content

The test conditions are as follows:
lubricant used: PAG ND8 lubricant
weight of lubricant: 5 g
weight of zeolitic adsorbent: 40 to 1000 mg
ambient temperature
duration: 2 hours The zeolitic adsorbent and the lubricant are introduced into a 10 ml colored flask. The flask is evenly stirred.

After 2 hours, the adsorbent is allowed to separate by settling and the lubricant is analyzed: the water content is quantitatively determined by Karl Fischer coulometric titration, Mettler DL37. The results are presented in the following table 3:

TABLE 3

| Adsorbent | Type of adsorbent | Amount of adsorbent (mg) | $H_2O$ (ppm) |
|---|---|---|---|
| None | — | — | 510 |
| Siliporite ® NK30 AP Powder | 3A | 40 | 135 |
| Siliporite ® NK30 AP Powder | 3A | 200 | 70 |
| Siliporite ® NK30 AP Powder | 3A | 1000 | 30 |
| Siliporite ® NK30 AP Powder overexchanged | 3A | 40 | 185 |
| Siliporite ® NK30 AP Powder overexchanged | 3A | 200 | 40 |
| Siliporite ® NK30 AP Powder overexchanged | 3A | 1000 | 30 |
| Siliporite ® NK30 Beads (Static) | 3A | 1000 | 230 |
| Siliporite ® NK10 AP Powder | 4A | 1000 | 35 |
| Siliporite ® NK20 | 5A | 1000 | 300 |
| Siliporite ® G5 XP Powder | 10A | 1000 | 520 |

These results show that the zeolitic adsorbents of 3A and 4A type make possible better drying at ambient temperature than that obtained with adsorbents of 5A or 10A type.

What is claimed is:

1. A process for limiting or controlling the increase in the total acid number in a refrigerating composition comprising at least one refrigerant and at least one lubricant, said process comprising a stage of bringing said refrigerating composition into contact with at least one zeolitic adsorbent, wherein the at least one zeolitic adsorbent is free of metal impregnation and the at least one zeolitic adsorbent is based on zeolite(s) A exchanged with potassium, the degree of exchange of which is between 50% and 70% (reported as molar equivalents) of all of the exchangeable cationic sites, wherein the at least one zeolitic adsorbent is present in an effective amount to limit or reduce the total acid number of the lubricant and the effective amount is about 40 mg to about 1000 mg per 5 g of lubricant.

2. The process as claimed in claim 1, wherein the at least one zeolitic adsorbent is chosen from a mixture of zeolite A type and one or both of zeolites of faujasite type and zeolites Y.

3. The process as claimed in claim 1, wherein the at least one zeolitic adsorbent is chosen from a mixture of zeolites of zeolite A type and zeolites of faujasite type.

4. A process for limiting or controlling the increase in the total acid number in a refrigerating composition comprising at least one refrigerant and at least one lubricant, said process comprising a stage of bringing said refrigerating composition into contact with at least one zeolitic adsorbent, in the form of a powder formed of zeolite(s) or of agglomerate(s) formed of zeolite(s), wherein the at least one zeolitic adsorbent is free of metal impregnation and the at least one zeolitic adsorbent is based on zeolite(s) A exchanged with potassium, the degree of exchange of which is between 50% and 70% (reported as molar equivalents) of all of the exchangeable cationic sites, wherein the at least one zeolitic adsorbent is present in an effective amount to limit or reduce the total acid number of the lubricant and the effective amount is about 40 mg to about 1000 mg per 5 g of lubricant.

5. The process of claim 2, wherein the at least one zeolitic adsorbent is present in the effective amount to limit or reduce the total acid number ("TAN-14 day") of the lubricant such that the total acid number is maintained at or below 2.7 mg KOH/g.

6. The process as claimed in claim 1, wherein the at least one lubricant is chosen from the lubricants employed in the fields of refrigeration and air conditioning for air or gas compressors and for refrigerating machine compressors and more generally for all dynamic or static refrigeration systems.

7. The process as claimed in claim 1, wherein the at least one refrigerant comprises fluorinated compounds.

8. The process as claimed in claim 1, wherein the at least one lubricant is selected from the group consisting of polyalkylene glycols (PAGs), polyol esters (POEs), polyvinyl ethers (PVEs), and combinations thereof.

9. The process as claimed in claim 1, wherein the at least one lubricant is a lubricant used in refrigeration systems and comprises at least one refrigerant chosen from hydrofluoroolefins (HFOs) and hydrofluorocarbons (HFCs).

10. The process as claimed in claim 1, wherein the at least one lubricant is a mixture of a lubricant and of a refrigerant, said mixture being chosen from PAG lubricant and 1,1,1,2-tetrafluoroethane, PAG lubricant and 2,3,3,3-tetrafluoropropene, POE lubricant and 1,1,1,2-tetrafluoroethane, POE lubricant and 2,3,3,3-tetrafluoropropene, PVE lubricant and 1,1,1,2-tetrafluoroethane, and PVE lubricant and 2,3,3,3-tetrafluoropropene, preferably comprising PAG and 1,1,1,2-tetrafluoroethane, PAG and 2,3,3,3-tetrafluoropropene, PVE and 1,1,1,2-tetrafluoroethane and PVE and 2,3,3,3-tetrafluoropropene.

11. The process as claimed in claim 1, wherein the lubricating composition is employed in refrigeration systems, motor vehicle or domestic air conditioning systems, heat pumps, electric transformers or metal cutting and milling instruments.

12. The process of claim 1, wherein the at least one zeolitic adsorbent is selected from the group consisting of zeolite 3A powder and agglomerates based on zeolite A powder, wherein the potassium exchange is carried out on the powder, the agglomerate, or both.

13. A process for limiting or controlling the increase in the total acid number in a refrigerating composition comprising at least one refrigerant and at least one lubricant, said process comprising a stage of bringing said refrigerating composition into contact with at least one zeolitic adsorbent, wherein the at least one zeolitic adsorbent is free of metal impregnation and the at least one zeolitic adsorbent is based on zeolite(s) A exchanged with potassium, the degree of exchange of which is between 50% and 70% (reported as molar equivalents) of all of the exchangeable cationic sites, and at least one other alkali or alkaline earth metal, the degree of exchange of which is between 30% and 50% (reported as molar equivalents) of all of the exchangeable cationic sites.

14. The process of claim 13, wherein the at least one other alkali or alkaline earth metal is sodium.

15. The process of claim 13, wherein the at least one zeolitic adsorbent is present in an effective amount to limit or reduce the total acid number of the lubricant such that the total acid number ("TAN-14 day") is maintained at or below 2.7 mg KOH/g.

16. The process of claim 7, wherein the at least one refrigerant is selected from the group consisting of hydrofluoroolefins (HFOs), hydrofluorocarbons (HFCs), and combinations thereof.

17. The process of claim 16, wherein the at least one refrigerant is selected from the group consisting of tetrafluoroethanes, tetrafluoropropenes, and combinations thereof in all proportions.

18. The process of claim 17, wherein the at least one refrigerant is selected from the group consisting of 1,1,1,2-tetrafluoroethane (R-134a), 2,3,3,3-tetrafluoropropene (HFO-1234yf), and combinations thereof.

19. The process of claim 8, wherein the at least one lubricant is selected from the group consisting of PAGs, PVEs, and combinations thereof.

20. The process of claim 9, wherein the at least one refrigerant is selected from the group consisting of tetrafluoroethanes, tetrafluoropropenes, and combinations thereof.

21. The process of claim 20, wherein the at least one refrigerant is selected from the group consisting of 1,1,1,2-tetrafluoroethane, 2,3,3,3-tetrafluoropropene, and combinations thereof.

22. The process of claim wherein the at least one zeolitic adsorbent is present in an effective amount to limit or reduce the total acid number of the lubricant and the effective amount is about 40 mg to about 1000 mg per 5 g of lubricant.

23. The process of claim 1, wherein the at least one zeolitic adsorbent is based on zeolite(s) 3A.

24. The process of claim 1, wherein the at least one zeolitic adsorbent is based on zeolite(s) 4A.

25. The process of claim 1, wherein the at least one zeolitic adsorbent is based on zeolite(s) 5A.

26. The process of claim 1, wherein the at least one zeolitic adsorbent provides for a total acid number ("TAN-14 day") in the refrigerating composition of 2.7 or less (mg KOH/g).

27. The process of claim 26, wherein the TAN-14 day value is 0.4 to 2.7 (mg KOH/g).

28. A process for limiting or controlling the increase in the total acid number in a refrigerating composition comprising at least one refrigerant and at least one lubricant, said process comprising a stage of bringing said refrigerating composition into contact with at least one zeolitic adsorbent, wherein the at least one zeolitic adsorbent is free of metal impregnation and the at least one zeolitic adsorbent is based on zeolite(s) A exchanged with potassium, the degree of exchange of which is between 50% and 70% (reported as molar equivalents) of all of the exchangeable cationic sites, wherein the at least one zeolitic adsorbent is present in an effective amount to limit or reduce the total acid number ("TAN-14 day") of the lubricant such that the total acid number is maintained at or below 2.7 mg KOH/g.

* * * * *